US009619006B2

(12) United States Patent
Samih et al.

(10) Patent No.: US 9,619,006 B2
(45) Date of Patent: Apr. 11, 2017

(54) ROUTER PARKING IN POWER-EFFICIENT INTERCONNECT ARCHITECTURES

(75) Inventors: Ahmad Samih, Austin, TX (US); Ren Wang, Portland, OR (US); Christian Maciocco, Portland, OR (US); Tsung-Yuan C. Tai, Portland, OR (US)

(73) Assignee: Intel Corporation, Santa Clara, CA (US)

(*) Notice: Subject to any disclaimer, the term of this patent is extended or adjusted under 35 U.S.C. 154(b) by 485 days.

(21) Appl. No.: 13/994,780

(22) PCT Filed: Jan. 10, 2012

(86) PCT No.: PCT/US2012/020700
§ 371 (c)(1),
(2), (4) Date: Sep. 11, 2013

(87) PCT Pub. No.: WO2013/105931
PCT Pub. Date: Jul. 18, 2013

(65) Prior Publication Data
US 2014/0149766 A1    May 29, 2014

(51) Int. Cl.
*G06F 1/26*       (2006.01)
*G06F 1/32*       (2006.01)
(Continued)

(52) U.S. Cl.
CPC .............. *G06F 1/325* (2013.01); *H04L 45/06* (2013.01); *H04L 45/127* (2013.01)

(58) Field of Classification Search
CPC ...................................... G06F 1/325
(Continued)

(56) References Cited

U.S. PATENT DOCUMENTS

2010/0142448 A1    6/2010  Schlicht et al.
2011/0119322 A1*   5/2011  Li ...................... G06F 15/7842
                                                          709/201
(Continued)

FOREIGN PATENT DOCUMENTS

KR   10-2010-0075285 A   7/2010
WO       2013/105931 A1  7/2013

OTHER PUBLICATIONS

Matsutani, et al., Performance, Area, and Power Evaluations of Ultrafine-Grained Run-Time Power-Gating Routers for CMPs, IEEE Transactions on Computer0Aided Design of Integrated Circuits and Systems, vol. 30, No. 4, Apr. 2011, pp. 520-533.*

(Continued)

*Primary Examiner* — Robert Cassity
(74) *Attorney, Agent, or Firm* — Law Office of R. Alan Burnett, P.S.

(57) ABSTRACT

A method and apparatus for selectively parking routers used for routing traffic in mesh interconnects. Various router parking (RP) algorithms are disclosed, including an aggressive RP algorithm where a minimum number of routers are kept active to ensure adequate network connectivity between active nodes and/or intercommunicating nodes, leading to a maximum reduction in static power consumption, and a conservative RP algorithm that favors network latency considerations over static power consumption while also reducing power. An adaptive RP algorithm is also disclosed that implements aspects of the aggressive and conservative RP algorithms to balance power consumption and latency considerations in response to ongoing node utilization and associated traffic. The techniques may be implemented in internal network structures, such as for single chip computers, as well as external network structures, such as computing clusters and massively parallel computer architectures. Performance modeling has demonstrated substantial power (Continued)

reduction may be obtained using the router parking techniques while maintaining Quality of Service performance objectives.

19 Claims, 7 Drawing Sheets

(51) Int. Cl.
  *G06F 1/00* (2006.01)
  *H04L 12/721* (2013.01)

(58) Field of Classification Search
  USPC .......................................................... 713/320
  See application file for complete search history.

(56) References Cited

U.S. PATENT DOCUMENTS

| | | | | |
|---|---|---|---|---|
| 2011/0235531 | A1* | 9/2011 | Vangal | H04L 47/30 370/252 |
| 2011/0243147 | A1* | 10/2011 | Paul | H04L 45/60 370/401 |
| 2012/0011383 | A1* | 1/2012 | Bhoj | G06F 1/26 713/323 |
| 2012/0166843 | A1* | 6/2012 | Muralidhar | G06F 1/3203 713/323 |

OTHER PUBLICATIONS

International Preliminary Report on Patentability and Written Opinion received for PCT Patent Application No. PCT/US2012/020700, mailed on Jul. 24, 2014, 6 pages.

International Search Report and Written Opinion received for PCT Application No. PCT/US2012/020700, mailed on Sep. 27, 2012, 9 pages.

Akkaya, A. et al., "A survey on routing protocols for wireless sensor networks", Elsevier, Ad Hoc Networks 3, 2005, pp. 325-349.

Moscibroda et al., "A Case for Bufferless Routing in On-Chip Networks", Jun. 20-24, 2009, pp. 1-12.

Kim et al., "FlexiBuffer: Reducing Leakage Power in On-Chip Network Routers", Jun. 5-10, 2011, pp. 936-941.

Soteriou et al., "Exploring the Design Space of Self-Regulating Power-Aware On/Off Interconnection Networks", IEEE Transactions on Parallel and Distributed Systems, vol. 18, Issue No. 3, Mar. 2007, pp. 393-408.

H. Matsutani, M. Koibuchi, D. Ik; Performance, area, and power evaluations of ultrafinegrained run-time power-gating routers for cmps. Computer-Aided Design of Integrated Circuits and Systems, IEEE Trans. on, 3.

* cited by examiner

US 9,619,006 B2

ROUTER PARKING IN POWER-EFFICIENT INTERCONNECT ARCHITECTURES

FIELD OF THE INVENTION

The field of invention relates generally to interconnect architecture in computer systems or networked computer and, more specifically but not exclusively relates to use of a router parking approach to reduce power consumption in computer systems or networks employing multiple processing nodes.

BACKGROUND INFORMATION

Chip Multi Processors (CMPs) such as Intel® Corporation's 48-core Single Chip Computer SCC, and cluster-based single-platform architectures such as Intel's microserver, are increasingly becoming the mainstream hardware architectures for a wide range of computing platforms. In such emerging systems, the interconnect fabric consumes an ever increasing power in the quest for higher bandwidth and larger number of cores (or correspondingly nodes). Unfortunately, such interconnects do not come at a low power cost. Recent studies show that Intel's Nehalem Dual-Lane QPI, Intel's 80-core chip, and MIT's RAW chip interconnect consumes 20%, 30%, and 40%, respectively, of their uncore power. Furthermore, as technology and operating voltages continue to scale down as evidenced by Intel's 22 nm transistor technology, and near-threshold voltage proposals, the proportion of static power relative to total power is becoming increasingly more significant.

With an increasing number of core/nodes in the system, more core/nodes would be eligible to go to low power states (Intel's core/node parking model) depending on the system load. However, even though a core/node is in a low power state and not generating any interconnect traffic, its attached router remains always active in order to maintain the capability of forwarding packets on behalf of other nodes, even though it may not be necessary, resulting in relatively high interconnect power consumption with low utilization.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
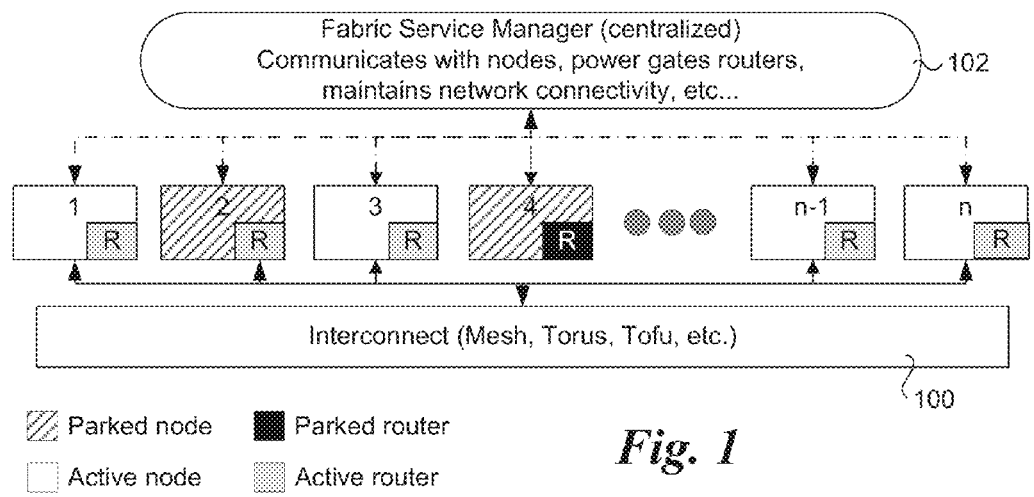
FIG. 1 is a high-level architecture of a Router-Parking framework, according to one embodiment.

Embodiments of methods and apparatus for router parking are described herein. In the following description, numerous specific details are set forth (such as exemplary embodiments depicting mesh interconnect architectures or on-chip interconnects) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of interconnect architectures and novel methods to reduce the interconnect power consumption and adapt to workloads are disclosed herein. One aspect of the architecture is to power-gate (i.e., "park") selected interconnect routers that belong to nodes that are in deep sleep states while maintaining performance QoS for running workloads, namely, Router-Parking. Router-Parking suggests rerouting and aggregating traffic away from parked routers taking into consideration the latency impact of rerouted traffic, network connectivity and optimal energy to route packet from source to destination.

Under sophisticated topologies, such as Mesh or Torus interconnects, keeping all routers that belong to parked cores active may not be necessary since there usually exists multiple paths from a given source to a given destination through which a packet can be routed. Those unnecessary active routers often result in a high interconnect idling power consumption. Through the use of Router-Parking and related principles disclosed herein, substantial reduction in static power consumption can be obtained.

Router-Parking provides adaptively and proactively aggregating traffic to certain routers and power-gating others. Today's low power state entry policy is usually timeout based. For typical workloads, without proactively aggregating traffic, the dispersed traffic keeps all routers lightly loaded but active, even when their associated nodes are parked. Under various embodiments of the Router-Parking approach, certain routers are selectively parked such that they are no longer employed for packet forwarding and can enter a low power state. However, parking routers associated with parked nodes can cause several issues. For example, a series of parked routers may cause interconnect network partitions; a case in which some nodes may not be able to reach other nodes. Further, there is a trade-off between the number of parked routers (which leads to static power savings) and the impact on average and/or maximum network latency due to introduced detours around the parked routers.

Several factors may trigger cores/nodes to go into deep sleep states (park), which therefore alters the active-to-parked node configuration (e.g., which nodes are active, which nodes are parked, etc.). Furthermore, a high-core count accompanied by low system utilization may lead to a potentially large number of cores being parked in order to save power. The frequency at which the configuration of active-to-parked nodes changes can vary based on the system dynamics, ranging from very frequent active-to-parked node reconfigurations (a few microseconds), to infrequent reconfigurations (a few milliseconds or longer). In off-chip interconnects, the reconfiguration may occur even on a more coarse-grained time-frame due to the nature of node job scheduling.

Router Parking Architecture

FIG. 1 shows a high-level architecture of one embodiment of the Router-Parking framework. The system consists of n tiles interconnected together via an interconnect fabric 100. In general, the interconnect topology could be a mesh, torus, etc. In the embodiments illustrated herein, the interconnect fabric are based on a 2D-Mesh topology. However, the Router-Parking scheme can be applied to other interconnect configurations with minimal modifications. FIG. 1 shows that some of the tiles and their routers are active (active tiles are white, active routers are grey), some nodes are parked (crosshatched) and their routers are active, and some nodes and their routers are both parked (parked routers shown in black). Additionally, the figure shows a component called a Fabric Manager (FM) 102. In one embodiment, the Fabric Manager is a centralized point-of-contact that is responsible for configuring, monitoring and reconfiguring the router parking related changes.

The centralized characteristic of the FM supports efficient operation of Router-Parking implementations, based on the following. First, changes in the interconnect configuration warrant a change in individual routers' routing tables, which entails global information be visible to all nodes. Use of a centralized management entity facilitates this very efficiently. As an alternate configuration, in one embodiment this may be facilitated via a distributed approach; however, this configuration increases the operational complexity and latency for propagating interconnect configuration information. Second, in order to maintain full network connectivity, a top-view of the routers is implemented to make sure that each node can still reach every other node in the interconnect (or at least reach nodes in intercommunicating groups of nodes, as described below). Once again, this could be achieved with distributed operations at the cost of complexity.

Generally, the Fabric Manager functionality may be facilitated via various techniques for implementing embedded logic and associated operations. For example, FM functionality may be added to firmware for one of the tile's LLC cache controllers, or to one of the on-chip memory controllers. Optionally, FM functionality may be implemented as a special-purpose engine located in the fabric, similar to Intel's optical fabric (LightPeak) FM (see Intel Corp. Thunderbolt Technology. http://techresearch.intel.com/spaw2/uploads/files/Intel Light Peak White Paper.pdf, 2011, which provides several fabric management responsibilities, including setting up source-to-destination channels and handling topology changes. As detailed below, in one embodiment an on-chip Fabric Manager is implemented in a tile that is positioned in the middle of a Mesh network, such that the average distance to other nodes in the network is minimized One drawback of employing a centralized directory is having a single point of failure. Accordingly, in one embodiment multiple fabric managers may be employed along with associated fail-over logic, such that if a current master fabric manager fails, a slave manager may be promoted as the new master FM to replace the failed FM.

In one embodiment, network configuration operations are performed on a periodic or pseudo-periodic basis in an ongoing fashion. For example, at the end of each epoch, the FM follows a sequence of actions to prepare for a potential network reconfiguration. These steps include: (1) gathering information about cores that are already parked or going to be parked during the next epoch, (2) processing the gathered information to decide if a reconfiguration is warranted, and if so, which routers should be parked, and (3) in the case of reconfiguration, follow the reconfiguration process to push the new configuration to all/applicable routers in the system.

Under a pseudo-periodic implementation, reconfiguration is implemented over multiple epochs rather than employing instantaneous reconfiguration in order to reduce the overhead in computation and communication cost related to propagating the configuration changes. This could be as well viewed as lazy reconfiguration, since active-to-parked node changes are not populated to the FM instantly. Instead, changes are accumulated until the next epoch, at which point the FM processes the changes in bulk.

Gathering Node Information

In one embodiment, at the end of each epoch, the FM performs a "limited" broadcast to all currently active routers asking for the status of their associated nodes. The currently parked routers and their computing nodes will remain parked and will not be involved in the information gathering process to reduce overhead. Nodes with active routers reply to the FM with their status (parked or active). There are various techniques for enabling the FM to gather status from inactive nodes, and associated implementation considerations. For example, a small portion of logic in the node may be configured to be responsible for communicating with the FM; therefore, there is no need to wake up a whole computing node to reply to the FM's query. Second, a router may be configured to detect node inactivity through use of a timeout technique or the like, and send replies on the behalf of the node. Third, a node can notify the Fabric Manager before it goes to sleep. Upon receiving and or gathering the node status information, the Fabric Manager saves the information for future use.

The length of the epoch depends on how frequently the node configuration changes occur and the FM can adaptively adjust the epoch length depending on run time conditions to reduce associated overhead. For example, if the configuration is relatively stable over time, the FM selects a longer epoch length to reduce operation overhead. The epoch length may be tuned via use of feedback information, either determined beforehand (i.e., statically implemented logic), or during ongoing operations. For example, performance of various configurations may be modeled to determine the overhead associated with different epoch lengths. Under one model, the instantaneous stability Si is measured by the percentage of nodes that change status during one epoch. The change can be either from active to idle or vice versa. The FM then employs a low-overhead EWMA (Exponentially Weighted Moving Average) filter to obtain the long term stability Sl.

Processing Gathered Information

Once the FM receives the node status information, it processes it in order to generate a new interconnect configuration and decide which routers should be parked during the next epoch. All routers attached to parked nodes are marked as potential candidates to be parked.

Ideally, it would be desired to park all routers attached to parked nodes since this would yield the maximum static power savings. However, deciding on which routers to park among the marked routers is not an easy task due to several reasons. First, parking all marked routers may create network partitions—a case in which some active nodes cannot reach other active nodes. Such a scenario could have an undesirable impact on performance and reachability. Second, the greater the number of routers parked, the higher the average latency due to detours introduced around the parked routers. These higher latencies degrade performance and also overall energy efficiency due to higher switching power as more hops need to be traversed (when compared to configurations with less parked routers).

In one embodiment, the FM is implemented so as to evaluate three main design objectives while generating a new network configuration. First, the new configuration should not partition the network. That is, the FM makes sure that after parking certain marked routers, the network is still connected and all active nodes should be able to reach each other. Note that this requirement might be relaxed for special situations—for example, several functional partitions may not need to communicate with each other due to job independency. For example, in one embodiment nodes that are members of intercommunicating groups (i.e., nodes that need to communicate with one another but may not need to communicate with other nodes outside their intercommunicating group) should not be partitioned, but partitioning between intercommunicating groups is allowed, since there is no need to preserve communication between nodes that are not members of a common intercommunicating group. Second, the algorithm should be able to park the maximum number of routers in order to achieve the highest static power savings with light traffic load. Third, the algorithm should minimize the latency impact due to the introduced detours around parked routers to maintain desired performance level. Having these three design objectives in mind, the FM generates a bit map that represents which routers are parked and which routers are active during the upcoming epoch.

Populating the New Configuration

All nodes continue to follow the old network configuration and routing decisions until they receive new configuration information that commands a change to their current statuses. Once the FM creates the new configuration, it sends corresponding status information and/or configuration commands to applicable nodes in the system. For example, under alternative embodiments, configuration information is sent to either all nodes in a system or only nodes having active statuses that are to be reconfigured. (Under the latter approach, a given node does not change its operational status unless it gets new configuration information or a configuration command to change its status.) Upon receipt of the new configuration at the end of each epoch, if the bitmap bit corresponding to a given router indicates that the router can park, the router will power gate its ports, crossbar, and arbiters. On the other hand, if the bitmap indicates the given router is to remain active, the router updates its routing table to reflect the new network configuration. Note, to ensure packet deliverability, the router may need to wait until it flushes out all packets before it power gates its components. Further, the interconnect does not freeze when a transition occurs from one epoch to another, since some routers may be operating under the old routing configuration, while others may be operating under the new routing configuration. The combination may cause undeliverable packets and deadlocks; details for handling these corner cases are discussed below.

It is worth mentioning that reconfiguring the network and populating the results to all nodes is expensive, since the FM has to contact all nodes involved in order to update their routing tables. In order to reduce this overhead, the FM evaluates whether it should do a full reconfiguration for the network, or limit the changes to a subset of nodes, i.e., perform a local reconfiguration. The FM uses a threshold based on the instantaneous stability mentioned above; that is, if more than a certain percentage of nodes change their status during a given epoch, the FM will attempt a full reconfiguration. However, if few change their status, the FM will attempt to make local changes or no changes at all. For example, if during an epoch, only one node parks, then the FM does not try to park that router, which would result in avoiding a network reconfiguration for the epoch. This makes sense, since the power savings achieved by parking one router does not outweigh the power consumed by doing a full network reconfiguration for small epoch lengths. This threshold may generally be obtained via empirical evaluations. Similarly, if only one isolated computing node or core goes alive during an epoch, it immediately informs the FM, which then switches on the least number of routers to connect that node, while keeping the old configuration the same.

Figure 2:
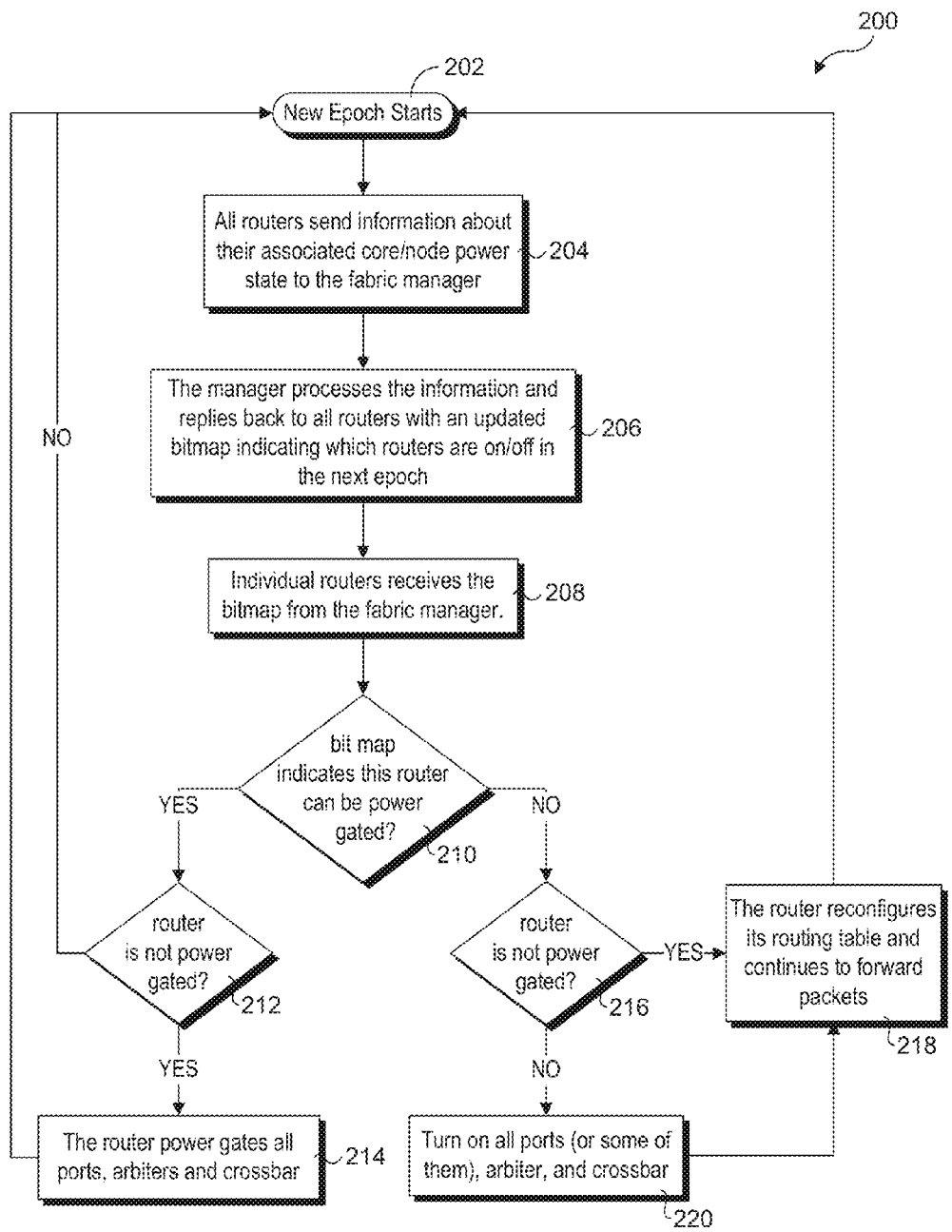
FIG. 2 is a flowchart illustrating logic and operations for performing reconfiguration and associated router parking and reactivation, according to one embodiment.

A flowchart 200 illustrating logic and operations for performing reconfiguration and associated router parking and reactivation, according to one embodiment, is shown in FIG. 2. The flowchart begins with a start loop block 202 indicating the start of each new epoch cycle. In a block 204, all routers send information about their associated core/node power state to the Fabric Manager. Optionally, such information may be obtained or otherwise received by the Fabric Manager, such as described above. The FM processes the information and replies back to the routers with an updated bitmap indicating which routers are to be on (active) or off (i.e., parked) in the next epoch, as shown in a block 206. In a block 208, the individual routers receive the bitmap from the FM. The remaining operations and logic depicted in flowchart 200 are performed by each router in response to receiving its updated bitmap.

This begins in a decision block 210, in which a determination is made to whether the bitmap indicates the router can be power gated (resulting in most of the power consumed by the router being turned off). For example, a bitmap may associate '1' with on and '0' with off. Accordingly, a value of '0' would result in a YES result from decision block 210, causing the logic to proceed to a decision block 212 in which a determination is made to whether the router is not already power gated. If the answer is YES, meaning the current state of a router targeted for parking is active, the router power gates all applicable ports, arbiters, memory and crossbar circuitry, which effectively puts the router in a parked or off state, as shown in a block 214. The logic then returns to start loop block 202 to repeat the cycle beginning at the next epoch.

Returning to decision block 210, if the answer is NO (meaning the router is to be operated in an active state), the logic proceeds to a decision block 216 in which a determination is made to whether the router is not power gated. If the router is not power gated, it is already in the active state, corresponding to a YES result. This causes the logic to proceed to a block 218 in which the router reconfigures its routing table based on its received bitmap and continues to forward packets, and the logic returns to start loop block 202. If the answer to decision block is NO, the router is switched from a parked state to an active state in a block 220 by turning on all applicable ports, its arbiter, and its crossbar circuitry. The router's routing table is then updated in block 218 and returned to start loop block 202 to await the next epoch.

Router Parking Algorithms

As mentioned above, the FM has a solution space that primarily comprises three parameters—the number of routers parked, the additional latency introduced, and maintaining the network connectivity. There is a wide range of algorithms that may be employed at the FM that differ in their aggressiveness regarding the number of parked routers and what trade off to enforce between the number of routers parked and introduced latency. Two basic alternatives, Aggressive-Router-Parking, and Conservative-Router-Parking algorithms, are first disclosed below. An Adaptive Router-Parking algorithm based on these algorithms and that chooses between the two algorithms according to run time interconnect condition is then discussed.

Aggressive Router-Parking Algorithm

Figure 3A:
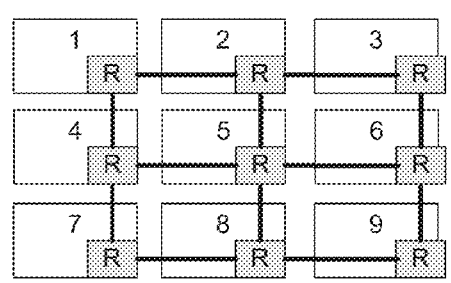
FIGS. 3a and 3b respectively show an example of a 9-node 2D-Mesh interconnect, and a corresponding connection graph representation of the interconnected routers.
Figure 3B:
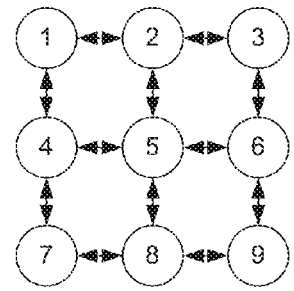

The first family of algorithms discussed favors router static power savings over latency impact. In these algorithms, the FM tries to park as many routers as possible while maintaining the network connectivity, regardless of the latency impact. The rationale behind studying such an algorithm is that, for some workloads, the packet injection rate is relatively low. Our evaluations show that over all SPECCPU2006 applications, running on a tiled-CMP with private L1 and L2 caches, the average packet injection rate of L2 misses on the interconnect fabric is 7.6 misses per 1000 cycles, with a maximum of 35 misses per 1000 cycles. This indicates that the amount of traffic being potentially detoured is low for such workloads. Hence, achieving maximum static power savings for the routers could still outweigh the increase in dynamic power due to long run-time detours as a result of parked routers. However, this family of algorithms is relatively complex since it requires an evaluation of network connectivity to find an optimal, or at least, a near-optimal router parking configuration. Further, this algorithm works best with interconnects that do not encounter very frequent configuration changes In one implementation, the FM views the interconnected routers as a graph G(V, E), where routers are depicted as vertices V, connected to each other via bidirectional edges E. FIG. 3a shows an example of a 9-node 2D-Mesh interconnect, while a corresponding connection graph (V, E) representation of the interconnected routers is shown in FIG. 3b.

Once the graph representation of the network is created, the FM can process the graph and evaluate its connectivity. Ideas from graph theory are borrowed as the starting point. One well-known algorithm is Tarjan's Strongly Connected Components (see R. Tarjan. Algorithm Design. *Communications of the ACM,* 1987). Tarjan's algorithm is used to calculate the number of strongly connected components in a Graph(V, E), and proven to have linear complexity of O(n). Note that, in a Mesh interconnect, any connected component is strongly connected since all links in a Mesh are bidirectional. Accordingly, Tarjan's algorithm is optimized for a Mesh topology such that only the number of connected components are determined instead of the original, and heavier algorithm to find strongly connected components.

---

Algorithm 1 A pseudo-code for the aggressive algorithm based on Tarjan's strongly connected components (SCC) algorithm to measure the network connectivity.

---

```
measure network connectivity( )
for all routers {v}; that belong to active nodes{n} do
    if v.visited then
        continue
    end if
    strongly connected component(v)
    number of strongly connected components ← number of strongly
    connected components + 1
    create a new strongly connected component list
    while stack is not empty do
        w ← pop( )
        add w to the new strongly connected component list
    end while
end for
if number of connected components = 1 then
    return TRUE //network connectivity is maintained
end if
return False
strongly connected component(v)
push(v)
v.visited ← 1
for all v's successors; {w} do //Do a depth - first search
    strongly connected component(w)
end for
```

---

The pseudo-code for one embodiment of an optimized Tarjan algorithm is shown above in Algorithm 1. As previously identified, this algorithm only finds the number of connected components. If the number is 1, this means that parking all potentially marked routers does not partition the network. If the number of components is more than 1, this means that there exists network partitions and all marked routers should not be parked. The FM needs to decide how to connect the partitions. Finding the optimal path to connect the two partitions could increase the complexity of this solution to O(nlogn) or even to $O(n^2)$. In order to keep the complexity at O(n), we opted to approximate the optimal solution and provide a near-optimal path to connect the two partitions.

As discussed above, partitioning may apply to groups of intercommunicating nodes rather than the entire network as a whole. Furthermore, each node may have a unique group of intercommunicating nodes, or none at all. For example, node 1 may have an intercommunicating group that includes itself along with 2, 3, 4, and 5, while node 2's intercommunicating group may include nodes, 1, 2, 7 and 9, and node 8 does not need to communicate with any other node. In general, the FM may maintain information corresponding to intercommunicating groups of nodes, or such information may be maintained in a distributed manner accessible to the FM.

In one embodiment, instead of testing all the potential combinations to connect partitions and find the optimal one, the FM locates the edge router of each partition, and performs a shortest path routing to obtain a near optimal path between partitions. If one or more routers belong to the path are parked in the previous epoch, the FM will turn them on to maintain network connectivity.

Figure 4A:
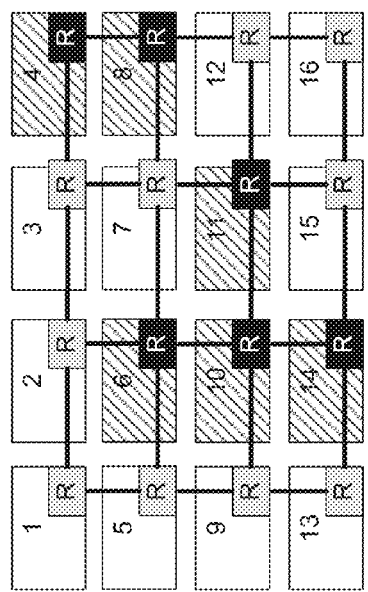
FIG. 4a-4d show an example of removing a partition, wherein FIGS. 4a and 4b respectively represent a 16-tile network and corresponding connection graph before partition removal, and FIGS. 4d and 4c respectively represent the 16-tile network and connection graph after the partition has been removed.
Figure 4B:
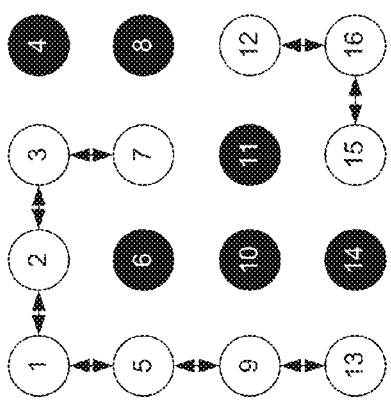
Figure 4D:
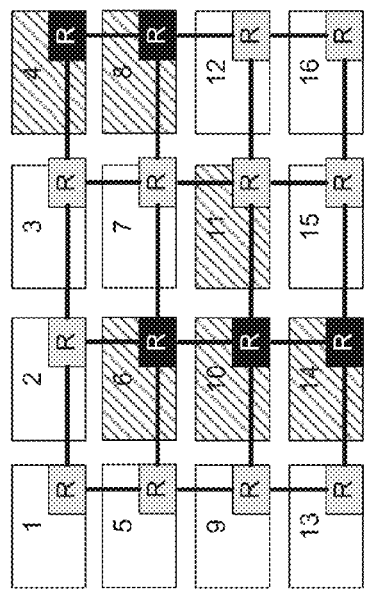
Figure 4C:
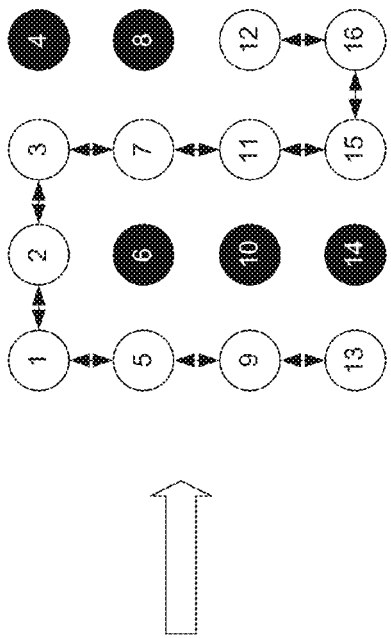

To illustrate the whole process, let's take a look at the example shown in FIGS. 4a-4d. FIG. 4a shows 16-tiles connected via a 2D Mesh topology, wherein each tile represents a processing core or node. Tiles in crosshatch are parked (i.e., cores in deep sleep state), while routers shown in black are parked. Meanwhile tiles shown in white and routers show in gray are active. Once the FM receives the status of these tiles, it marks routers associated with parked tiles as potential candidates for router parking. To apply the foregoing augmentation of Tarjan's algorithm, the FM views connected routers as a connection graph, as shown in FIG. 4b. In this graph and the graph of FIG. 4c, active routers are shown in white, while parked routers are shown in black and edges are depicted as double-headed arrows. As shown in FIG. 4b, no edges are connected to parked routers. FIG. 4c shows the configuration resulting from application of Algorithm 1. This results in two network partitions; a first partition comprising nodes 1, 2, 3, 5, 7, 9, 13, and a second partition comprising nodes 12, 15, and 16, with the remaining nodes 4, 6, 8, 10, 11 and 14 parked. The FM's responsibility is to maintain a connected network by connecting these two partitions. According to this family of Router-Parking algorithms, static power savings is favorable over performance, hence, it tries to connect the two partitions by leaving the minimum number of marked routers unparked; in this case, any of the parked routers 8, 11, and 14 could achieve the purpose. As shown in FIG. 4c, the two partitions are connected by excluding router 11 from parking. The corresponding state of the interconnect once the new configuration is populated to all routers is illustrated in FIG. 4d. Thus, under the aggressive approach only a single router out of the six potential candidate routers is left active, while the remaining five routers are parked.

Conservative Router-Parking Algorithm

The previous section discussed a family of algorithms that favors power savings over minimizing the latency impact of router parking. In this section, a conservative router parking approach that strives to strike a balance between power savings and latency impact is discussed.

Under relatively high packet injection rates, more packet rerouting due to parked routers could lead to high dynamic power consumption, which would offset the savings in the static power achieved by router parking. Therefore, there is a trade-off between the number of routers to park and the increase in the average extra hops to travel. The conservative router-parking algorithm strives to balance these two considerations.

The conservative router parking approach relies on a subtle observation: the reason network partitions and long detouring occur is because a series of direct (left, right, up, and down neighboring routers) and/or indirect (northeast, northwest, southeast, and southwest) neighbors are parked to form a contiguous disconnect (e.g., diagonal, vertical, horizontal, staircase, loops, etc.). Such series could partition the network, and/or introduce longer detouring latency. Thus, the conservative algorithm tries to address the two problems at once by disallowing any direct or indirect neighbor routers to park at the same time. Pseudo-code for one embodiment of the conservative algorithm is shown in Algorithm 2 below.

---

Algorithm 2 A pseudo-code for an algorithm that conservatively park routers that do not have any neighbors or immediate diagonal routers parked.

--- park routers conservatively( )
for all routers {v}; that belong to parked nodes{p} do
　park this router ← (any neighbor routers parked( ) OR any immediate diagonal routers parked( ))
　if park this router then
　　bit map[router number] ← 1
　end if
end for

---

Figure 5A:
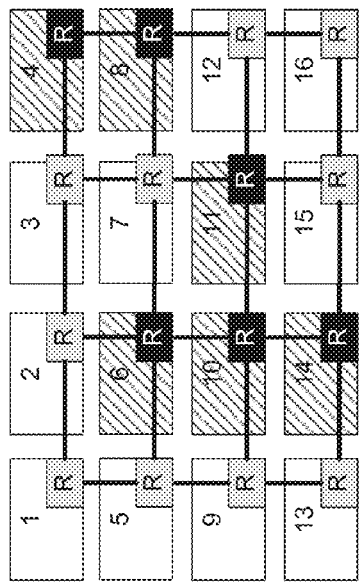
FIG. 5a-5d show an example of removal of a partition in combination with maintaining activation of an addition parked router candidate to improved network latency.
Figure 5D:
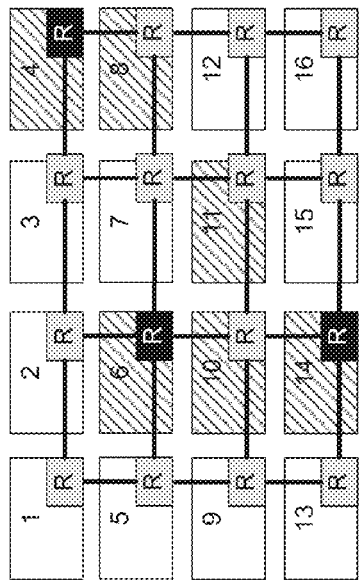
Figure 5B:
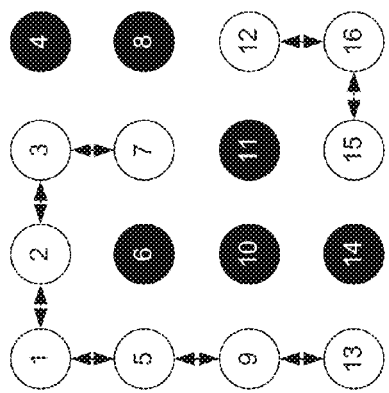
Figure 5C:
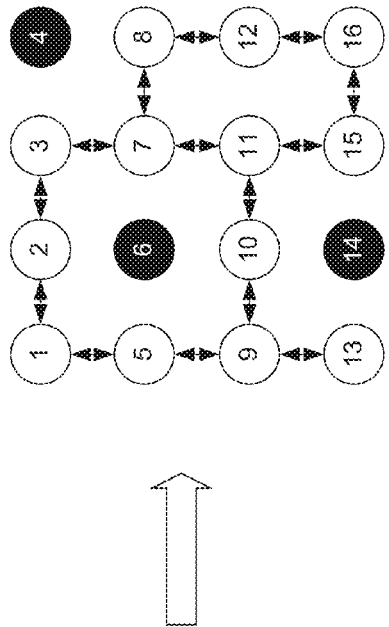

An example of an implementation of the conservative router-parking algorithm is illustrated in FIGS. 5a-5d. As before, initial configurations are shown in FIGS. 5a and 5b (identical to FIGS. 4a and 4b, respectively). The conservative algorithm does only one sweep over all routers, as mentioned earlier, it parks a router if none of the direct or indirect neighbors is parked. If the sweep starts from tile 1, the resulting network configuration is shown in FIGS. 5c and 5d. As illustrated, the result using the conservative algorithm is only three of the six candidate routers are allowed to park, with the remaining three left active. This is in contrast with the aggressive based approach, which was able to park five out of six potential candidate routers for the same example initial configuration. However, average latency between nodes under the conservative approach is much less that its counterpart under the aggressive scenario, since the path between a given pair of non-connected nodes has a smaller number of hops. The conservative algorithm works well with systems that undergo heavy node reconfigurations since the FM can quickly evaluate the Router-Parking algorithm and implement corresponding configuration changes.

Adaptive Router-Parking Algorithm

Figure 6:
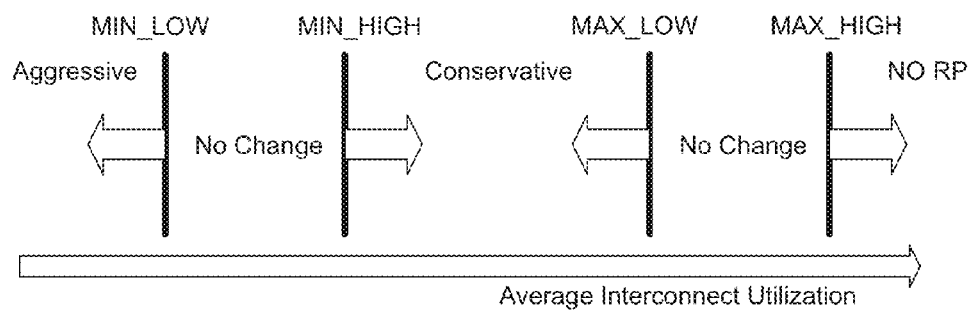
FIG. 6 shows a logical view of an adaptive router parking algorithm that combines aspects of an aggressive router parking algorithm with a conservative router parking algorithm.

With very low traffic rate, the majority of interconnect power is attributed to static power. In this case, the aggressive RP algorithm (RP-A) should be applied to maximize power saving. On the other hand, when the traffic rate increases, the dynamic power starts to play a more important role, where the aggressive RP algorithm becomes less favorable since it tends to increase the average number of hops and thus dynamic power. When the traffic rate continues to increase beyond a certain point, parking any routers may introduce significant performance impact and potentially no power saving. To have the best of all worlds, an adaptive Router-Parking (RP-Adp) algorithm has been developed that monitors the run time interconnect utilization and reacts accordingly to choose either aggressive, conservative (RP-C) or no RP algorithm. One embodiment of the algorithm is illustrated in FIG. 6.

In general, when the average dynamic power Pd, which is proportional to the number of packets switched per time unit, is smaller than a threshold MIN, indicating very light traffic, the aggressive RP algorithm should be used for maximum power saving. On the other hand, if Pd is larger than a threshold MAX, indicating heavy traffic, router parking should be turned off. When Pd is between MIN and MAX, the adaptive algorithm opts for conservative RP algorithm to reduce static power while keeping dynamic power low.

In our Adaptive Router Parking algorithm, guard bands are applied to both MAX and MIN to prevent oscillation and induced overhead. Specifically, four thresholds, MAX_LOW, MAX_HIGH, MIN_LOW, MIN_HIGH are used to decide when to switch the algorithms. When Pd is within the "no change" guard bands, no mode change is asserted, as illustrated in FIG. 6.

MAX and MIN are two important thresholds for the adaptive algorithm to select among RP-A, RP-C and No-RP. The guidelines on how to choose the two thresholds and the rationales behind the guidelines in accordance with one embodiment are as follows. Let $P_3$ denote the router static power, which is a design parameter for a specific interconnect. Intuitively, when Pd<$P_3$, RP-A should be selected as long as the extra dynamic power induced by extra hops traveled ($H_e$) does not outweigh the static power reduction, which can be expressed as following equation: $(H_e)$*Pd< $(R_p)$*$P_3$; where $R_p$ is the number of parked routers which is proportional to the reduction of the static power. According to design space experiments that have been performed, even for the worst case the number of average extra hops is always smaller than the number of parked routers, since packets can usually find other minimal or near-minimal paths. This means that $P_3$ is a reasonable value for the threshold MIN.

When choosing MAX to switch between No-RP and RP-C, the same condition holds for RP-C, i.e., if Pd>RpHe $P_3$, router parking should be turned off. $H_e$ depends on several empirical factors such as ratio of parked to active nodes and traffic pattern. In the design space experiments, the worst case RP-C increase in hop count as $H_e$ is 2 hops.

Deadlock Avoidance and Recovery.

The foregoing discussion has mainly focus on proactively and adaptively parking certain routers for energy efficiency, and do not mandate routing functions used for forwarding. Turn-model based routing algorithms are proved to be deadlock free and widely used. Accordingly, in one embodiment deadlock handling based on turn model routing is implemented. As mentioned earlier, although the approaches described herein have parallels with fault tolerant routing considerations, they address different situations in several aspects. Specifically, Router-Parking operates under low packet injection rate and low network traffic conditions. This means the chance that packets are waiting for resources in a cycle are very slim. When the traffic rate increases such that deadlocks may result, there should be little or no routers parked. Second, the non-functional routers in the RP scheme are not random faulty routers; instead, they are selected in such a way that the network is fully connected. Moreover, for the conservative RP algorithm, all of the parked routers are isolated.

Figure 7A:
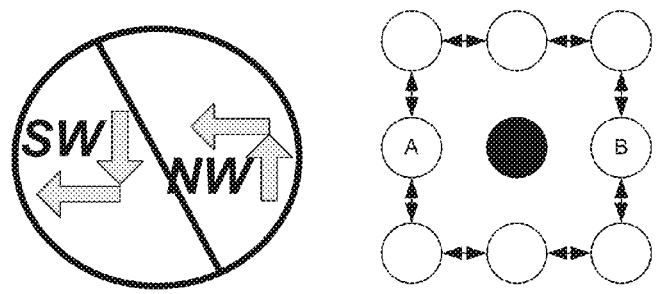
FIG. 7a shows implementation of a West-first routing rule under which Southwest and Northwest routes are not allowed, along with a corresponding connection graph.

Based on these properties, a simple but effective deadlock handling scheme that does not require extra virtual channels is implemented. For exemplary purposes without limitation, a west-first routing example is now presented to illustrate deadlock prevention and recovery schemes. The west-first algorithm disallows two turns to prevent deadlocks, NW (northwest) and SW (southwest) turns. Adherence to the turn model based algorithm with parked routers maintains the deadlock free property. However, it may reduce the network from strongly connected to weakly connected. Based on the location of parked routers, for given two nodes (A, B), node A can reach node B, however, there might be no return path from B to A, as shown in FIG. 7a. This is referred to as network inconsistency. This network inconsistency is addressed by allowing a specific turn to maintain the network consistency. In this case, the NW turn should be allowed so that router B can reach router A. However, when a turn is allowed, deadlock could occur in pathological cases when the traffic rate is relatively high. With very low traffic rate and minimally allowed turns, the deadlock probability is extremely low. In our experiments, deadlock is never encountered, since under the injection rate parameter rules for RP operation all routers become active when the injection rate exceeds a 0.06% packet injection rate.

Figure 7B:
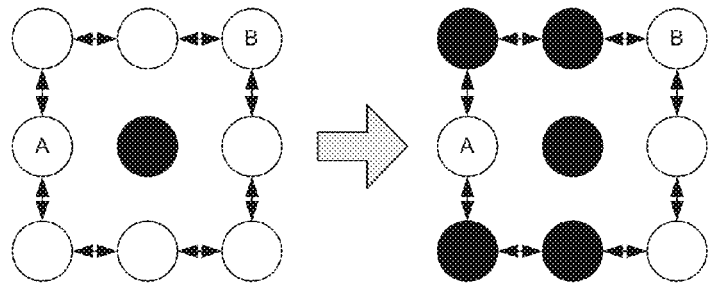
FIG. 7b shows an example of a network reconfiguration under which packets originating from node A may not be deliverable to node B.

FIG. 7a show an example of a case in which the router in the middle is parked, node A can obey the west-first turn model (graphically depicted in the left portion of the figure) and reach node B, while node B cannot reach node A if it obeys the west-first turn model. In FIG. 7b, node A's neighbors have been parked immediately once they receive a new configuration command before A can deliver all of its packets to B. As a result, some packets will be undeliverable.

Even with a low traffic rate, there exists a probability, albeit very small, for deadlocks to happen. In one embodiment, a deadlock recovery approach as proposed by J. Duato and T. Pinkston in A general theory for deadlock-free adaptive routing using a mixed set of resources. *Parallel and Distributed Systems, IEEE Trans. on,* 12(12):1219-1235, 2001, is implemented. This approach requires minimal resources, i.e., a flit buffer per router, for handling infrequent deadlocks while optimizing routing performance during normal operation. Deadlock occurrence is detected by a timeout mechanism. Upon detection, an expired flit in the deadlocked cycle is injected into a flit buffer and reinjected into the network when there is buffering available. The drawback of this solution is that a dedicated, additional flit buffer is needed for each router, however, this extra space is relatively small. This flit buffer is also used to facilitate the dynamic reconfiguration process as described next.

Performance QoS-Based Router Parking

Quality of Service (QoS) is typically associated with network bandwidth and associated latencies for packet transfers. In some embodiments, a performance QoS is implemented that further considers power consumption. Accordingly, these embodiments provided for preserving Quality of Service (QoS) levels on a network by considering the latency impact of rerouted traffic, network connectivity, and optimal energy to route packets.

Figure 8:
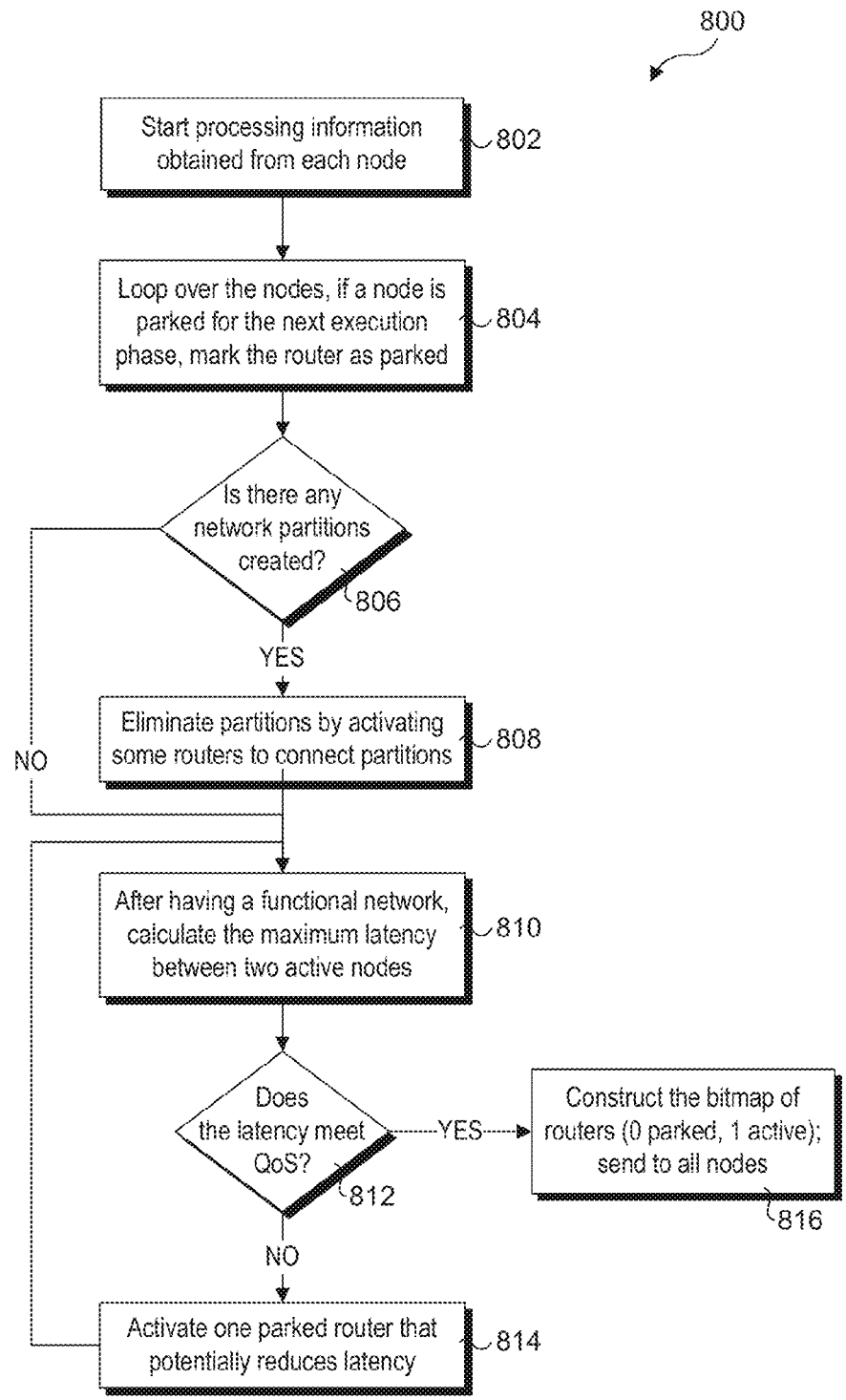
FIG. 8 is a flowchart illustrating operations and logic for implementing a performance Quality of Service router parking implementation, according to one embodiment.

FIG. 8 shows a flowchart 800 depicting operations and logic for implementing performance QoS, according to one embodiment. The process starts in a block 802 in which information received from each node during the most recent epoch begins to be processed. This processing continues in a block 804, by looping over the nodes and marking their parked status based on whether the node is parked for the next execution phase. In a decision block 806, a determination is made to whether any network partitions are created. If the answer is YES, the logic proceeds to a block 808 in which the partitions are eliminated by activating selected routers to connect partitions. For example, partition eliminations operations could be performed in the manner described above with reference to FIGS. 3a-3d.

Next, in a block 810 a maximum latency between pairs of active nodes is calculated. For example, if traffic congestion is not considered, the latency between any pair of nodes may be determined by the number of hops between the nodes. This technique could be augmented to consider forecast localized traffic congestion if corresponding information is available. For example, if a give routed path between nodes includes passes through a congested area, the latency calculation may produce a longer projected latency.

If the latency projection does not meet the QoS parameters, a parked router that potentially could reduce latency is selected for activation in a block 214, and the logic loops back to block 210 to recalculate the maximum latency. The set of operations in blocks 210, 212, and 214 is repeated until the answer to decision block 212 is YES, at which point the bitmap for the router configuration to be implemented for the next phase is generated and sent to the nodes, as depicted in a block 216. In one embodiment, the updated bitmap is sent to all the nodes. Under an alternative approach, the updated bitmap is not sent to already parked routers that are to remain parked.

In the foregoing example, QoS was determined based on a maximum latency between pairs of nodes. However, this is merely exemplary, as QoS could also be determined as a function of a maximum latency in combination with a projected power consumption of the network configuration, an average latency with or without projected power consumption considerations, etc. Moreover, based on measurements of node utilization and associated traffic, the logic and/or equations for determining QoS may be dynamically adapted during ongoing operations.

Dynamic Reconfiguration Protocol and Transient State Behavior

As mentioned earlier, when a transition occurs from one epoch to another, some routers may operate under the old network topology, while others may be operating under the new network topology. Further, if routers are allowed to park immediately once they receive a new configuration, a case may arise where some packets are rendered undeliverable. In which case, the packets cannot be routed to destination because they end up in positions where the new topology and routing function cannot handle them as shown in the FIG. 7b, which shows packets that are stuck in the middle of parked routers that parked immediately before A drains out all of its packets. Moreover, the transition from the old routing function to the new routing function may create additional dependencies among network resources, causing what is referred as reconfiguration-induced deadlock or ghost dependency.

Many current techniques handle the ghost dependency problem using static configuration methods, where packet injection is prohibited and all in-flight packets have to be drained from the entire network before the new topology and configuration is deployed. Though it easily avoids any reconfiguration-induced deadlocks, it reduces network availability drastically, thus the whole system performance during every reconfiguration event, which happens relatively often in Router Parking implementations as compared to general fault tolerance networks. Thus, it is not the preferred approach. Rather, these problems are addressed via use of techniques for handling both undeliverable packets and reconfiguration induced deadlock employing low overhead methods.

Handling of Potentially Undeliverable Packets

As mentioned earlier, the new network configuration will be sent out from the Fabric Manager to all involved routers. Packets that were injected under the old routing configuration are referred to as antique packets, while packets injected with new routing configuration are called fresh packets. In order to guarantee that the antique packets are delivered to their destinations, the routers follow the following steps.

When a router receives the new routing information, it updates its routing table based on the new configuration. From this point on, all flits coming in will be routed according to the new routing table. All the normal network operation continues without disruption.

If the router is approved by the Fabric Manager to be parked during the next epoch, it fires a timer with a value set to $2*p*(n-1)$ cycles; where p is the number of cycles for a packet to traverse one hop, and n is the number of nodes in the system. In the worst case, it takes $p*(n-1)$ cycle for the whole network to receive network update after this router receives first update message (usually it will be much less than that). In worst case, after whole network is updated, it takes another $p*(n-1)$ cycles to flush all the antique packets in the network (assuming traffic is light and queuing delay is negligible). Thus, after $2*p*(n-1)n$ cycles, all the old packets are flushed from the network, and the marked routers can safely be parked without causing undeliverable packet problem.

The reconfiguration deadlock (or ghost dependency) may happen during the transition period from the old routing configuration to the new routing configuration, when additional dependencies among network resources are created. Since Router-Parking operates in low traffic rate, the deadlock happens rarely. This deadlock is solved by ejecting an expired packet in the deadlocked cycle to the flit buffer and re-injecting it into the network when there is buffering available.

Network Modeling and Test Results

The projected performance of the various Router-Parking aspects discussed herein has been modeled to produce test data corresponding to selected parameters, such as static energy, dynamic energy, and network latency. The testing was done with using a cycle-accurate multi-core simulation infrastructure based on Windriver Simics 4.7 (P. S. Magnusson et al., Simics: A Full System Simulation Platform. *Computer*, 35(2), 2002), a full system simulation platform with a cycle accurate interconnect model based on the Garnet interconnect model (L. S. P. Niket Agarwal, Tushar Krishna and N. K. Jha. GARNET: A Detailed On-Chip Network Model inside a Full-System Simulator, 2009), and the Orion 2.0 power model (A. Kahng, B. Li, L. -S. Peh, and K. Samadi. Orion 2.0: A fast and accurate noc power and area model for early-stage design space exploration. In *Design, Automation Test in Europe Conf Exhibition*, 2009, pages 423-428, 2009). Throughout the evaluations, the default configuration is a 64-core (8×8) CMP connected via a 2D-Mesh.

In order generate interconnect traffic and evaluate the Router-Parking algorithms, a combination of synthetic traffic and real applications' traffic was used. The main advantage of using synthetic traffic is to stress test the Router-Parking algorithm. As discussed above, real applications tend to have low packet injection rates, hence, with synthetic traffic, we can play with such parameters to show how the various Router-Parking algorithms would perform. The main evaluation is conducted using the synthetic traffic. The real traffic is used as a use case to show the potential of this approach and to confirm the modeled results obtained via use of the synthetic traffic. The real traffic workloads were based on the SPECCPU2006 benchmarks.

The test results showed that use of aggressive Router-Parking fits conditions where the packet injection rate is very small since under such conditions the static energy exceeds the dynamic energy. Whereas under very high packet injection rates, router parking should not be applied, since the dynamic energy is much larger than static energy, and any increase in average latency would offset static energy reductions. Under moderate packet injection rates, the conservative algorithm showed competence. On average, for synthetic and real workloads, Router-Parking reduces static energy by 38%, 39%, respectively, and by up to 61%, and 64%, respectively. Additionally, Router-Parking reduces the total interconnect energy by 28% and 38%, respectively, while only reducing the performance by 7% in the worst case, and less than 1% on average.

Exemplary SCC Implementation

Figure 9:
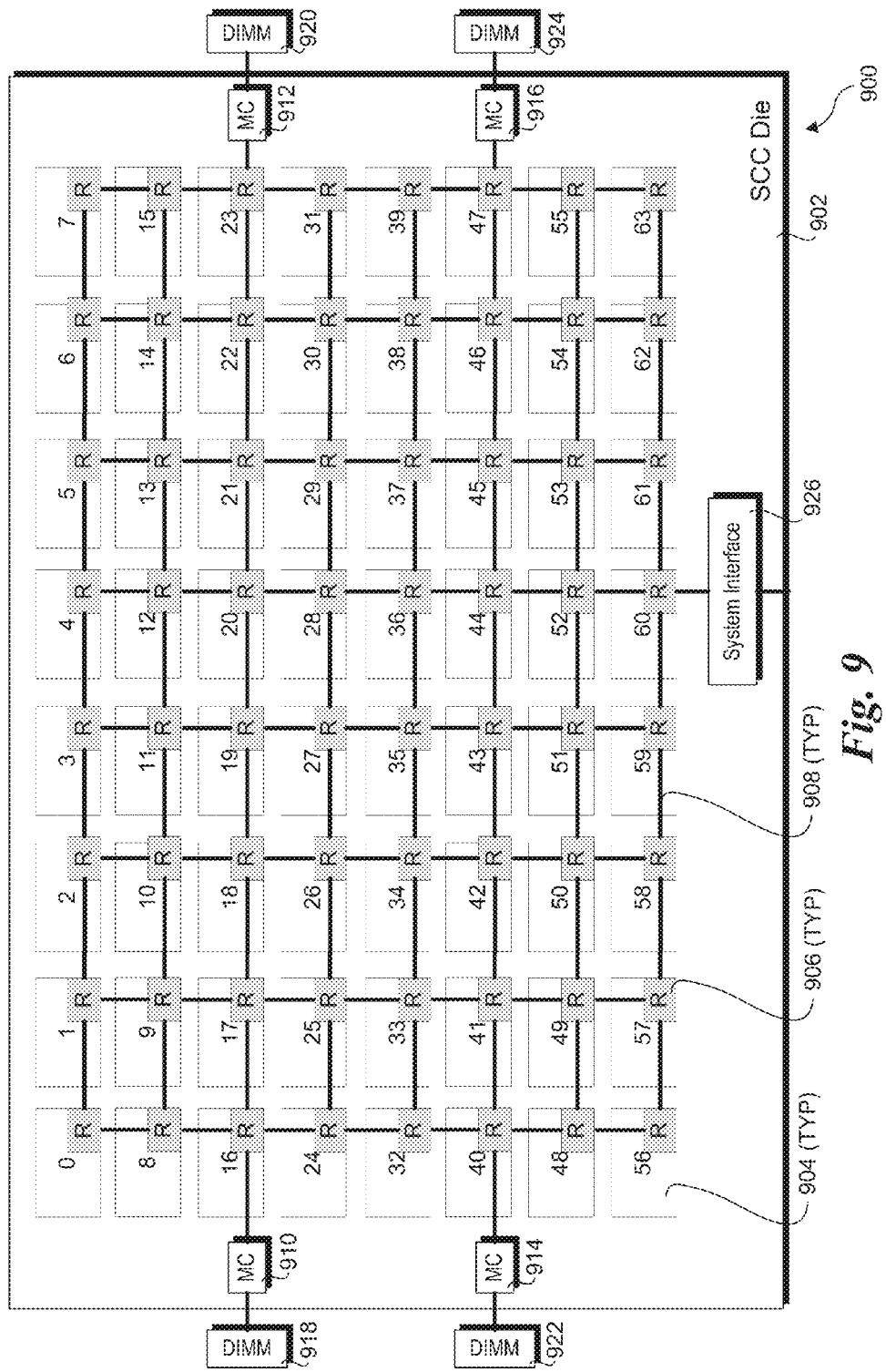
FIG. 9 is a schematic diagram of an exemplary system including a Single Chip Computer (SCC) die having a 64-tile 2D Mesh interconnect.

An exemplary Single Chip Computer (SCC) implementation of various aspects of the Router-Parking embodiments described herein is shown in FIG. 9. At the core of a system 900 is an SCC die 902, including 64 tiles 904, each with a respective router 906. Each tile operates as a node in the internal network of SCC die 902, with the tiles interconnected via a mesh interconnect including a plurality of links 908. SCC die 902 further includes four memory controllers (MC) 910, 912, 914, and 916, each respectively connected to a portion of external memory depicted as DIMMs 918, 920, 922, and 924. In addition, SCC die includes a system interface 926. As will be recognized by those skilled in the art, the configuration for SCC die 902 is merely exemplary, and an actual implementation may include more or less tiles and memory controllers.

Each tile 904 corresponds to a separate processing element, which typically may include a processor or core, L1/L2 cache, and potentially other cache levels and controllers, such as a private L3 or distributed L3 cache and associated controllers. Memory coherency may be obtained through use of applicable memory/cache agents and coherency protocols. For example, in one embodiment, links 908 comprise QPI (QuickPath®️ Interconnect) links, which employ a coherent memory protocol inherent to QPI. In another embodiment, links 908 comprise KTI (Keizer Technology Interconnect) links. Other types of interconnect links may also be used, as well as other types of interconnect architectures. For examples, the tiles could also be connected via a torus mesh, or may correspond to cores coupled to nodes on ring interconnects that are, in turn, interconnected via corresponding ring-to-ring links.

Although depicted on an SCC die, the tiles, routers, and interconnect links in FIG. 9 may also be representative of processing elements in a computing cluster or the like, with each interconnect comprising a network link between processing nodes, such as an Ethernet link, optical link, etc. In addition, each tile could represent a separate processor in a computing system with a large number of processors, or sections of tiles could correspond to separate multi-core processors, with each tile representing cores in the processors, and certain interconnect links corresponding to processor-to-processor links rather than in-die links. Moreover, in addition to the two-dimensional configurations depicted in the drawings herein, similar schemes may be applied to three-dimensional processing tile or node computer implementations. For example, aspects of the Router Parking algorithms described above may be implemented in a computing system including a plurality of processors configured in a 3D mesh interconnected via wired and/or optical interconnects or future 3D semiconductor processor core arrays. The techniques may also be implemented in massively parallel computer architectures and computer cluster architectures having routers connected at either the processor and/or processor core granularity.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    employing routers to facilitate transmission of data between a plurality of nodes connected via a plurality of interconnect links, each router associated with a respective node;
    detecting nodes among the plurality of nodes that are inactive nodes;
    selectively parking routers associated with a portion of the inactive nodes while operating other routers associated with the inactive nodes in an active state by,
    determining an operational state of each of the plurality of nodes;
    for each node determined to be in an inactive state, identifying its associated router as a potential candidate for parking;
    determining if there are any network partitions corresponding to a router configuration under which each potential candidate for parking would be parked; and,
    if one or more network partitions exist in the configuration; and
    selecting routers from among the potential candidates to activate or keep active to remove the one or more network partitions.

2. The method of claim 1, further comprising:
    determining intercommunicating groups of nodes for which communication between nodes in an intercommunicating group is to be maintained; and
    selecting routers to be parked such that there are no network partitions within an intercommunicating group.

3. The method of claim 1, wherein the plurality of nodes comprise processing elements on a semiconductor die.

4. The method of claim 1, further comprising selecting routers to be parked based, in part, on power consumption considerations.

5. The method of claim 1, further comprising selecting routers to be parked based, in part, on Quality of Service considerations.

6. The method of claim 1, further comprising dynamically reconfiguring an activation state of the plurality of routers on an ongoing basis in response to run time interconnect utilization.

7. The method of claim 1, further comprising selecting addition routers from among the potential candidates to activate or keep active based on latency considerations.

8. The method of claim 1, further comprising employing a router parking algorithm on an ongoing basis to reconfigure the operating status of selected routers in response to input parameters including power consumption and latency inputs.

9. The method of claim 1, further comprising parking a router by changing the state of the router from an active state to a parked state by power gating ports of the router, an arbiter, and crossbar circuitry associated with the router.

10. The method of claim 1, further comprising implementing changes in router configuration for a network reconfiguration over multiple cycles to avoid undelivered packets.

11. A semiconductor apparatus, comprising:
    a plurality of processing nodes, each operatively coupled to a respective co-located router;
    an interconnect, comprising a plurality of links interconnecting the plurality of routers; and
    embedded logic, configured to perform operations comprising, acquire node status information indicating an active or inactive operating status of each of the plurality of processing nodes;

for each processing node in an inactive state, identify its associated router as a potential candidate for parking;

determine if there are any network partitions corresponding to a router configuration under which each potential candidate for parking would be parked; and, if one or more network partitions exist in the configuration; and select routers from among the potential candidates to activate or keep active to remove the one or more network partitions.

12. The apparatus of claim 11, wherein the configuration of the mesh interconnect after the routers are parked ensures there are no network partitions between processing nodes having an active status.

13. The apparatus of claim 11, further comprising a fabric manager comprising embedded logic for implementing management of the plurality of routers, wherein the logic is configured to enable the fabric manager to perform operations when the apparatus is operating comprising:

determining a current network configuration including an operational state of each of the plurality of processing nodes;

for each processing node in an inactive state, identifying its co-located router as a potential candidate for parking;

determining a reconfiguration of the network to be implemented; and sending configuration information to effect the reconfiguration of the network to the plurality of routers.

14. The apparatus of claim 13, wherein each of the routers is configured to at least one of forward or return operational status information to the fabric manager.

15. The apparatus of claim 13, wherein parking a router is effected by changing the state of the router from an active state to a parked state by power gating ports of the router, an arbiter, and crossbar circuitry associated with the router.

16. A system, comprising:

a plurality of processing nodes, each operatively coupled to a respective co-located router;

an interconnect, comprising a plurality of links interconnecting the plurality of routers; and embedded logic comprising a central router management entity, communicatively coupled to each of the processing nodes via the plurality of links, and configured to perform operations comprising, acquire node status information indicating an active or inactive operating status of each of the plurality of processing nodes;

for each processing node in an inactive state, identify its associated router as a potential candidate for parking;

determine if there are any network partitions corresponding to a router configuration under which each potential candidate for parking would be parked; and, if one or more network partitions exist in the configuration; and select routers from among the potential candidates to activate or keep active to remove the one or more network partitions.

17. The system of claim 16, wherein the processing nodes comprise a plurality of processors interconnect via a plurality of wired and/or optical links.

18. The system of claim 16, wherein the processing nodes are configured in three dimensions, and the mesh interconnect comprises a 3D mesh interconnect.

19. The system of claim 16, wherein the central router management entity is configured to reconfigure the router configuration on any ongoing basis in view of node utilization and associated interconnect traffic.

* * * * *